2,910,403

ANTI HYPERTENSIVE COMPOSITIONS COMPRISING 2 - METHYL - 5,8 - DIMETHOXYCHROMONE AND ACETAMIDES

Robert R. Brendel, Oreland, Jay Morton Beiler, Whitemarsh, and Gustav J. Martin, Philadelphia, Pa., assignors to The National Drug Company, Philadelphia, Pa., a corporation of Delaware No Drawing. Application January 30, 1956
Serial No. 562,018

8 Claims. (Cl. 167—65)

This invention relates to and has for its object the provision of novel compositions (and methods for their preparation) useful as medicinals especially in the treatment of hypertension. The compositions of the invention comprise combinations of 2-methyl-5,8-dimethoxychromone with certain acetamides.

Although 2-methyl-5,8-dimethoxychromone is known to be useful in the treatment of hypertension, it has now been found that its effect may be potentiated by administration in association with acetamides. Thus, use of the combination of chromone and acetamide extends the duration of action of the chromone. Consequently, fewer doses and a smaller daily overall dose of the chromone is required. Furthermore, even in oral administration, the maximum blood pressure drop is reached in an appreciably shorter time with the combination than when the chromone is given alone.

The acetamides useful in the combinations of this invention may be represented by the general formula

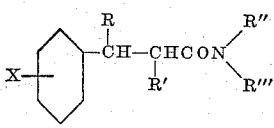

wherein X is halogen, lower alkyl or alkoxy; R is a member of the group consisting of hydrogen and lower alkyl; and R' is a member of the group consisting of lower alkyl and allyl; and R''' are members of the group consisting of hydrogen, lower alkyl and allyl. One method of producing them is described in application Serial No. 398,428, filed December 15, 1953, and now abandoned.

Particularly effective for use in the invention are α - allyl - α - benzylacetamide, α - allyl - α - 1 - phenylethylacetamide, N,N - diallyl - α - allyl - α - benzylacetamide, and N,N-diethyl-α-allyl-α-benzylacetamide, especially α-allyl-α-benzylacetamide. Also useful in the invention are any of the other compounds disclosed in the above-mentioned U.S. application Serial No. 398,428. The 2-methyl-5,8-dimethoxychromone may be prepared, for example, by contacting 2,5-dimethoxy-6-hydroxyacetophenone with ethyl acetate in the presence of an alkali metal condensing agent, dehydrating the 2,5-dimethoxy-6-hydroxybenzoylacetone thereby obtained by contact with a mineral acid, and recovering the desired chromone. The compositions of the invention may be prepared in any of the various dosage-unit forms for either oral use or intravenous injection. Thus, tablets may be prepared to preferably contain about 2–10 mg. chromone and about 25–250 mg. acetamide. This mixture of active ingredients may be compounded in the usual manner to contain fillers and/or binders such as starch, dextrose, stearates, carbonates, kaolin or talc, then compressed to form the tablets. Also the mixture of active ingredients, in combination with other filling materials, if desirable, many be encapsulated for ingestion using one or two piece gelatin capsules. Furthermore, the combination may be dissolved or suspended in an inert solvent or solvent mixture and administered as such.

As has been indicated above it is possible to administer the combinations of this invention by administering the components separately, for example, by first administering the chromone, then the acetamide or vice-versa. Utilizing such procedure the potentiating effect of the acetamide on the chromone is clearly observed. However, it is simpler to utilize the combination simultaneously, since this method is most economical and expedient. The required daily dosage of the ingredients is of the order of 100 mg. of acetamide and 25 mg. of chromone. However, larger or smaller quantities may be desirably used. For example, one may use as much as 1000 mg. or more of acetamide and 250 mg. or more of the chromone, or as little as 25 mg. or less of the acetamide and 5 mg. or less of the chromone.

Numerous test data have been obtained showing the in vivo effectiveness of the combinations of the invention and typical results are tabulated below:

EXPERIMENT A (1) 10 mg./K. chromone I.V.—Drop of 50 mm.—20 minute duration.—Total recovery in 100 minutes.

(2) Acetamide 200 mg./K. orally no effect, but (3) Followed by 10 mg./K. chromone I.V.—Drop of 50 mm.—duration over 2 hours.

To these figures it might be well to add the results on oral administration which were supplied.

EXPERIMENT B (1) Chromone 50 mg./K. orally—40% drop reached in 60 minutes. Recovery complete in 120 minutes.

(2) Acetamide 200 mg./K. orally no effect, but (3) Acetamide 200 mg./K. orally+chromone 50 mg./K. orally—45% drop reached in 30 minutes. Recovery beginning in 60 minutes—requires 120 minutes for completion.

Following are typical formulations coming within the scope of the invention. It is to be specifically understood, however, that these examples are merely illustrative and not limitative of the invention.

Example 1.—Suspension (Containing α-allyl-α-benzylacetamide, 100 mg. and 2-methyl-5,8-dimethoxychromone, 400 mg. per 15 ml. suspension.)

| | |
|---|---:|
| α-Allyl-α-benzylacetamide _____gm__ | 4.0 |
| 2-methyl-5,8-dimethoxychromone _____gm__ | 16.0 |
| Veegum gel _____gm__ | 150.0 |
| Tragacanth _____gm__ | .6 |
| Glycerin _____ml__ | 60.0 |
| Butyl p-hydroxybenzoate (.1% aqueous solution) _____gm__ | .6 |
| Propyl p-hydroxybenzoate (.1% aqueous solution) _____gm__ | .6 |
| Methyl p-hydroxybenzoate (.1% aqueous solution) _____gm__ | .6 |
| d-Sorbitol (70% aqueous solution) _____ml__ | 600.0 |

(1) Dissolve butyl, methyl and propyl p - hydroxybenzoates in glycerin with heat.

(2) Add an equal amount of d-sorbitol.

(3) Gradually triturate tragacanth, 2-methyl-5,8-dimethoxychromone and α-allyl-α-benzylacetamide in the mix.

(4) Add Veegum gel with constant stirring; bring to volume with d-sorbitol homogenize.

Example 2.—Capsules (Containing α-allyl-α-benzylacetamide 100 mg., 2-methyl-5,8-dimethoxychromone 400 mg.)

α-Ally-α-benzylacetamide _____ gm__ 50.0
2-methyl-5,8-dimethoxychromone _____ gm__ 200.0

(1) Mix, sieve through No. 40 U.S. standard sieve.
(2) Fill .5 gm. in hard gelatin capsules.

Example 3.—Compressed Tablet (Containing α-allyl-α-benzylacetamide 100 mg. and 2-methyl-5,8-dimethoxychromone 400 mg. per tablet.)

α-Allyl-α-benzylacetamide _____ gm__ 50.0
2-methyl-5,8-dimethoxychromone _____ gm__ 200.0
Powdered sugar _____ gm__ 25.0
Corn starch _____ gm__ 75.0

(1) Mix ingredients above, sieve through No. 40 U.S. standard sieve.
(2) Granulate with equal parts mucilage acacia, simple syrup.
(3) U.S.P. and distilled water.
(4) Sieve through No. 12 U.S. standard sieve.
(5) Dry at 95° F.
(6) Sieve through No. 12 U.S. standard sieve.
(7) Add talc 2% containing magnesium stearate ½%.
(8) Compress.
(9) Assay.

This invention may be variously otherwise embodied within the scope of the appended claims.

What is claimed is:

1. A pharmaceutical composition essentially containing 2-methyl-5,8-dimethoxychromone; and an acetamide of the formula:

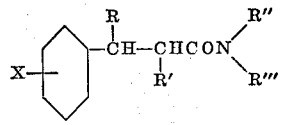

wherein X is a member of the group consisting of hydrogen, halogen, lower alkyl and lower alkoxy; R is a member of the group consisting of hydrogen and lower alkyl; R' is a member of the group consisting of lower alkyl and allyl; and R" and R'" are each members of the group consisting of hydrogen, lower alkyl and allyl.

2. The composition of claim 1 wherein the acetamide is α-allyl-α-1-phenylethylacetamide.

3. The composition of claim 1 wherein the acetamide is N,N-diallylalkylbenzylacetamide, the alkyl compound of which is a lower alkyl.

4. The composition of claim 1 wherein the acetamide is N,N-diethyl-α-allyl-α-benzylacetamide.

5. The composition of claim 1 wherein the acetamide is α-allyl-α-benzylacetamide.

6. A method for reducing blood pressure which comprises sequentially administering (1) 2-methyl-5,8-dimethoxychromone; and (2) an acetamide of the formula

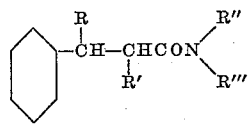

wherein R is a member of the group consisting of hydrogen and lower alkyl; R' is a member of the group consisting of lower alkyl; and R" and R'" are each members of the group consisting of hydrogen, lower alkyl and allyl.

7. A pharmaceutical composition essentially containing 2-methyl-5,8-dimethoxychromone; and an acetamide of the formula:

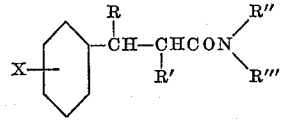

wherein X is a member of the group consisting of hydrogen, halogen, lower alkyl and lower alkoxy; R is a member of the group consisting of hydrogen and lower alkyl; R' is a member of the group consisting of lower alkyl and allyl; and R" and R'" are each members of the group consisting of hydrogen, lower alkyl and allyl in a solid pharmaceutical carrier.

8. A pharmaceutical composition essentially containing 2-methyl-5,8-methoxychromone; and an acetamide of the formula:

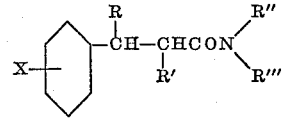

wherein X is a member of the group consisting of hydrogen, halogen, lower alkyl and lower alkoxy; R is a member of the group consisting of hydrogen and lower alkyl; R' is a member of the group consisting of lower alkyl and allyl; and R" and R'" are each members of the group consisting of hydrogen, lower alkyl and allyl in a liquid pharmaceutical carrier.

References Cited in the file of this patent

UNITED STATES PATENTS

| | | |
|---|---|---|
| 1,658,122 | Gunzler | Feb. 7, 1928 |
| 1,707,863 | Kropp | Apr. 2, 1929 |
| 1,921,722 | Berendes | Aug. 8, 1933 |
| 2,721,826 | Cronheim | Oct. 25, 1955 |
| 2,762,745 | Benend | Sept. 11, 1956 |

OTHER REFERENCES

Squibb Abstr. Bull., Aug. 1, 1951, p. A695, "Chloromycetin preparations, contg. acetamide, N,N-dimethyl,"